United States Patent
Kemmer et al.

(10) Patent No.: US 11,721,817 B2
(45) Date of Patent: Aug. 8, 2023

(54) FUEL CELL, FUEL CELL STACK AND METHOD OF OPERATING A FUEL CELL STACK

(71) Applicant: Robert Bosch GmbH, Stuttgart (DE)

(72) Inventors: Helerson Kemmer, Vaihingen (DE); Kai Weeber, Heimsheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/781,752

(22) PCT Filed: Nov. 5, 2020

(86) PCT No.: PCT/EP2020/081081
§ 371 (c)(1),
(2) Date: Jun. 2, 2022

(87) PCT Pub. No.: WO2021/110347
PCT Pub. Date: Jun. 10, 2021

(65) Prior Publication Data
US 2023/0027847 A1  Jan. 26, 2023

(30) Foreign Application Priority Data
Dec. 4, 2019  (DE) ............ 10 2019 218 870.2

(51) Int. Cl.
*H01M 8/04223* (2016.01)
*H01M 8/2457* (2016.01)
(Continued)

(52) U.S. Cl.
CPC ..... *H01M 8/04246* (2013.01); *H01M 8/0247* (2013.01); *H01M 8/1004* (2013.01);
(Continued)

(58) Field of Classification Search
CPC ........ H01M 8/04246; H01M 8/0247; H01M 8/1004; H01M 8/1065; H01M 8/2457; H01M 2008/1095
See application file for complete search history.

(56) References Cited

U.S. PATENT DOCUMENTS

2017/0352904 A1  12/2017 Ashton et al.

FOREIGN PATENT DOCUMENTS

DE          10328255 A1    1/2005
DE     102008011306 A1 *  9/2008  ............ H01M 8/02
(Continued)

OTHER PUBLICATIONS

Miller, DE 102008011306A1 Espacenet machine translation, 2008 (Year: 2008).*
(Continued)

*Primary Examiner* — Adam A Arciero
(74) *Attorney, Agent, or Firm* — Michael Best & Friedrich LLP

(57) ABSTRACT

The invention relates to a fuel cell (1) for a fuel cell stack (11), comprising a polymer membrane (2) which serves as an electrolyte and has respectively on both sides a catalyst layer (3, 4) for forming an anode (3) on the one side and a cathode (4) on the other side, a gas diffusion layer (5) and a bipolar plate (6) being applied to each of the two analyst layers (3, 4). According to the invention, a short-circuit element (7) is applied, preferably printed, to at least one bipolar plate (6), namely on the side facing away from the gas diffusion layer (5). The invention also relates to a fuel cell stack (11) and to a method for operating a fuel cell stack (11).

18 Claims, 5 Drawing Sheets

(51) Int. Cl.
    *H01M 8/0247*     (2016.01)
    *H01M 8/1004*     (2016.01)
    *H01M 8/1065*     (2016.01)
    *H01M 8/10*     (2016.01)

(52) U.S. Cl.
    CPC ....... *H01M 8/1065* (2013.01); *H01M 8/2457* (2016.02); *H01M 2008/1095* (2013.01)

(56) References Cited

FOREIGN PATENT DOCUMENTS

| | | | | |
|---|---|---|---|---|
| DE | 102008001306 A1 | 10/2009 | | |
| DE | 102013004838 A1 | 9/2013 | | |
| DE | 102013020841 A1 | 6/2015 | | |
| DE | 102013226028 A1 * | 6/2015 | ......... | B60L 11/1883 |
| DE | 102013226028 A1 | 6/2015 | | |
| EP | 1492189 A1 | 12/2004 | | |
| EP | 3022335 A1 | 5/2016 | | |
| JP | 2013206868 A | 10/2013 | | |
| WO | WO-2016162289 A1 * | 10/2016 | | |

OTHER PUBLICATIONS

Kemmer, DE 102013226028 A1 Espacenet machine translation, 2013 (Year: 2013).*

Schneiter, WO 2016162289A1, WIPO machine translation, 2016 (Year: 2016).*

Translation of International Search Report for Application No. PCT/EP2020/081081 dated Apr. 13, 2021 (2 pages).

* cited by examiner

FUEL CELL, FUEL CELL STACK AND METHOD OF OPERATING A FUEL CELL STACK

BACKGROUND

The invention relates to a fuel cell for a fuel cell stack. The invention further relates to a fuel cell stack having at least two fuel cells of the invention, and to a method for operating such a fuel cell stack.

Fuel cells are electrochemical energy transformers. Reactants used may be hydrogen ($H_2$) and oxygen ($O_2$), which by means of the fuel cell are transformed into electrical energy, water ($H_2O$), and heat. For this the fuel cell comprises an anode and a cathode and also an electrolyte in between them. In the operation of the fuel cell, the anode is supplied with hydrogen and the cathode with oxygen.

The electrochemical reaction in a fuel cell is catalyzed typically by platinum. For this purpose in general small particles of platinum are applied to a porous carbon support.

In the operation of a fuel cell there may—at least temporarily—be a local undersupply of hydrogen and hence there may be unwanted side-reactions. The risk of an undersupply of hydrogen exists in particular during start-up of the fuel cell. At this point in fact both the cathode region and the anode region are full of air ("air/air start-up"). As hydrogen is supplied, the anode region becomes filled, although individual regions remain without hydrogen for longer. In these regions there are high differences in potential between the cathode and the electrolyte, leading possibly in turn to corrosion of carbon in the cathode catalyst layer. This degradation process, also referred to as reverse current decay (RCD), lasts for as long as the $H_2/O_2$ gas front is moving through the anode region.

Because the process described above may occur whenever the anode region is locally undersupplied with hydrogen, while the cathode region is full of air, the same effect may also set in when the fuel cell is being run down. It is at this point in fact that the hydrogen supply is shut off and the remaining hydrogen present in the anode region is consumed by reaction in contact with oxygen which enters the anode region by way of the ambient air. Here, the hydrogen present close to an entry or an exit is consumed by reaction first, meaning that there is an uneven distribution of hydrogen, which triggers or promotes the degradation process.

Another degradation mechanism, called cell reversal, occurs if in the operation of the fuel cell the supply of hydrogen is not sufficient to cover the demand for current. If a current is driven through a hydrogen-depleted fuel cell, there may be unwanted side-reactions (e.g., carbon corrosion and/or water electrolytes) in the anode catalyst layer in order to provide the required electrons. This in turn may lead to irreversible damage to the fuel cell.

One efficient technique for preventing degradation on fuel-cell start-up and/or run-down is that of short-circuiting. Short-circuiting ensures that the potentials of the cathode and of the anode coincide and that the harmful increase in potential is reduced. But if the short-circuit is imposed on a plurality of cells, the cell voltage is indeed zero overall, but not necessarily in every individual cell, and so cell damage may still result. If, moreover, certain cells are undersupplied with hydrogen, there may be degradation due to "cell reversal".

In the prior art, accordingly, proposals have already been made to impose the short-circuit cell-specifically. Reference is made here, illustratively, to DE 10 2013 226 028 A1. A problem with cell-specific short-circuiting, however, is the circuitry, which necessitates costly and complicated cabling with multiple switches and/or a corresponding logic system for switching on and off.

Starting from the prior art identified above, the problem addressed by the present invention is that of simplifying cell-specific short-circuiting. The solution implemented is additionally to save on costs and installation space.

SUMMARY

The fuel cell proposed for a fuel cell stack comprises a polymer membrane which serves as an electrolyte and which comprises on either side a catalyst layer for forming an anode on one side and a cathode on the other. The two catalyst layers each bear an applied gas diffusion layer and an applied bipolar plate. In accordance with the invention at least one bipolar plate bears an applied, preferably printed, short-circuit element, this being on the side facing away from the gas diffusion layer.

The proposed fuel cell accordingly comprises a short-circuit element on at least one outer side, preferably on both outer sides, for the realization of cell-specific short-circuiting. For this purpose the short-circuit element is contacted with another short-circuit element of a further fuel cell, which is disposed in a mirrored disposition on the first fuel cell. To end the short-circuit, the contact is removed. The advantages of cell-specific short-circuiting are therefore achieved entirely without cabling and switches, as the short-circuit element itself serves as a switch. In this way, installation space and costs are saved equally.

The short-circuit element is preferably an elastically deformable element, such as a small plate or a membrane, for example. The switching procedure in this case may be achieved by elastic deformation of the short-circuit element.

In order to bring about the switching, or the elastic deformation required therefor, on the part of the short-circuit element, a further proposal is that the short-circuit element bounds a pressurizable pressure compartment. Through pressurization of the pressure compartment, a pressure force acts on the elastically deformable short-circuit element and leads ultimately to the required elastic deformation of the short-circuit element. When the pressurization is ended and/or the pressure in the pressure compartment is stepped down, the short-circuit element regains its original form.

The short-circuit element may be configured such that the elastic deformation leads to a short-circuit or eliminates an existing short-circuit. This means that, depending on the specific embodiment of the short-circuit element, the pressurization of the pressure compartment leads to a short-circuit or to the elimination of a short-circuit.

A short-circuit is advantageously produced if pressure is stepped down in a pressure compartment and/or in a side channel, so that the short-circuit elements of two adjacent fuel cells spring back to their original state and the short-circuit faces of the short-circuit elements lie directly against one another. An advantage of this embodiment is that in the shut-off phase or in the event of a fault, there is a short-circuit, which constitutes an inherently safe state. The elimination of the short-circuit takes place in operation, in other words in a state in which pressure is present. This pressure may then be utilized to pressurize the pressure compartment.

The short-circuit element in relaxed state is preferably already concave or convex in its implementation, this simplifying the configuration of the pressure compartment. It is proposed, furthermore, that the short-circuit element bounds the pressure compartment together with the bipolar plate. In this case the pressure compartment is formed between the bipolar plate and the short-circuit element. This means that the short-circuit element does not lie over its full area against the bipolar plate.

In a development of the invention, it is proposed that the pressure compartment is pressurizable via a side channel, which preferably is formed in the bipolar plate and/or traverses the bipolar plate. The pressure medium may be a gas, such as hydrogen or air, for example, as these gases are available. Alternatively the pressure medium used may be a liquid, such as a coolant, for example, which is generally likewise available in a fuel cell system. On pressurization with the respective pressure medium, the pressure in the pressure compartment may be 2 to 3 bar, for example.

Advantageously the short-circuit element is prestressed. The prestressing may be achieved at the stage of application, preferably by printing, to the bipolar plate, and/or when a plurality of fuel cells are stacked on one another. Preferably, in the course of stacking, two fuel cells are placed one atop another in such a way that the short-circuit elements face one another and lie over one another.

In the case of prestressing of the short-circuit elements, the pressurization of the pressure compartment may lead to further deformation of the short-circuit element against the prestressing or in the prestressing direction.

It is proposed, furthermore, that the bipolar plate and the short-circuit element at least regionally bear an applied, preferably printed, seal. The primary purpose of the seal is to seal off the pressure compartment from the outside. Preferably, therefore, the seal circumferentially surrounds the short-circuit element. With further preference the seal is also formed around the side channel, so that the latter as well is sealed off from the outside.

Alternatively or additionally it is proposed that the seal completely covers the short-circuit element. The seal is therefore able—at least temporarily—to prevent a short-circuit.

In order not to hinder the necessary elastic deformation of the short-circuit element, the seal as well is preferably made of an elastically deformable material.

As a progressive measure it is proposed that the short-circuit element has different zones which differ in terms of their electrical resistance. The zones may in particular be configured to lie within one another, so that, for example, a first zone having a first electrical resistance is surrounded by a second zone having a second electrical resistance, and so on. Depending on the shape of the short-circuit element, the various zones may also be vertically offset, so that a first zone having a first electrical resistance has a greater distance from the bipolar plate than, for example, a second zone having a second electrical resistance, and so on. In this case the more remote zone preferably has a higher electrical resistance than the following zone. This ensures that on each contacting of the short-circuit elements, the electrical resistance is continuously reduced, or on each elimination of the short-circuit it is continually increased.

For the solution to the problem stated at the outset, furthermore, a fuel cell stack is proposed which comprises at least two fuel cells of the invention. These fuel cells are stacked such that the respective short-circuit elements are disposed lying one above another in a mirrored disposition and make contact with one another in the region of a common short-circuit face in the event of a short-circuit.

To form the fuel cell stack, advantageously, more than just two fuel cells are stacked on one another. This enables the power of the fuel cell stack to be increased. In that case between each pair of fuel cells in the stack there are two short-circuit elements disposed, with a first short-circuit element being disposed on a bipolar plate of a first fuel cell and the further short-circuit element being disposed on the bipolar plate of the further fuel cell. In order to enable this arrangement, therefore, preferably each fuel cell has a respective short-circuit element on its two outer sides.

Furthermore, a method is proposed for operating the fuel cell stack of the invention. In the method, the short-circuit elements of the fuel cell of the fuel cell stack are selectively engaged and disengaged via a central pressure supply. Engagement via the central pressure supply removes the need for costly and complicated cabling and for the provision of a multiplicity of switches. In other words, installation space and costs may be saved. At the same time, by means of the central pressure supply, each individual fuel cell and each short-circuit element can be reached, and so cell-specific short-circuiting is realizable.

The short-circuit elements of the fuel cells of the fuel cell stack are preferably pressurized via the central pressure supply and elastically deformed. The elastic deformation in this case leads to the engagement or disengagement of the short-circuit elements. This means that the short-circuit elements each also act as switches.

According to a first preferred embodiment of the invention, the pressurization takes place using a gas, such as hydrogen or air, for example. Hydrogen and air are present fundamentally in a fuel cell system and are therefore available. An alternative proposal is that the pressurization be carried out using a liquid, such as a coolant, for example. Fuel cell systems generally possess a cooling circuit or at least are attached to a cooling circuit, and so the cooling medium as well is available as a pressure medium.

BRIEF DESCRIPTION OF THE DRAWINGS

The invention is elucidated in more detail below by means of the appended drawings. In the drawings.

DETAILED DESCRIPTION

Figure 1:
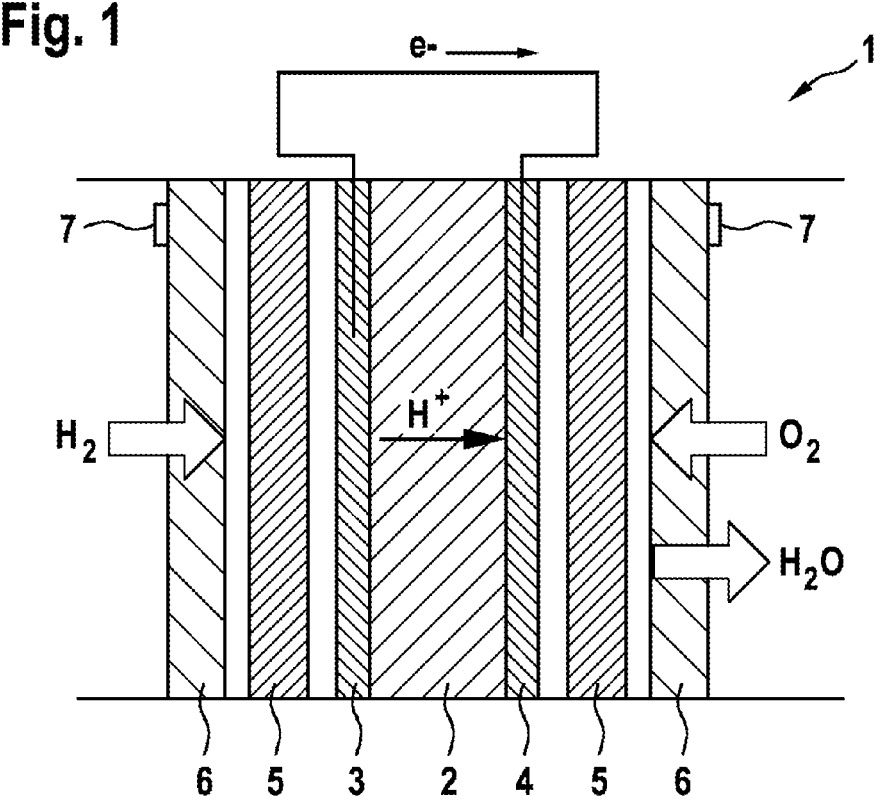
FIG. 1 shows a schematic representation of a fuel cell.

The construction of a fuel cell 1 of the invention is described illustratively using FIG. 1. A central element is a polymer membrane 2 which serves as an electrolyte. The polymer membrane 2 has on either side a catalyst layer 3, 4, with the catalyst layer 3 forming an anode and the catalyst layer 4 a cathode. The catalyst layers 3, 4 are each followed on either side by a gas diffusion layer 5 and by a bipolar plate 6.

In the operation of the fuel cell 1, the anode 3 is supplied with hydrogen (H$_2$) and the cathode 4 with oxygen (O$_2$). In a chemical reaction, the hydrogen and oxygen reactants are transformed into electrical energy, and water (H$_2$O) is also formed, and is taken off as product water.

In FIG. 1 it can be seen that on the outside of each of the bipolar plates 6 there is an element 7 disposed. This element is a short-circuit element 7, which is elucidated in more detail below by FIGS. 2 to 8.

Figure 2:
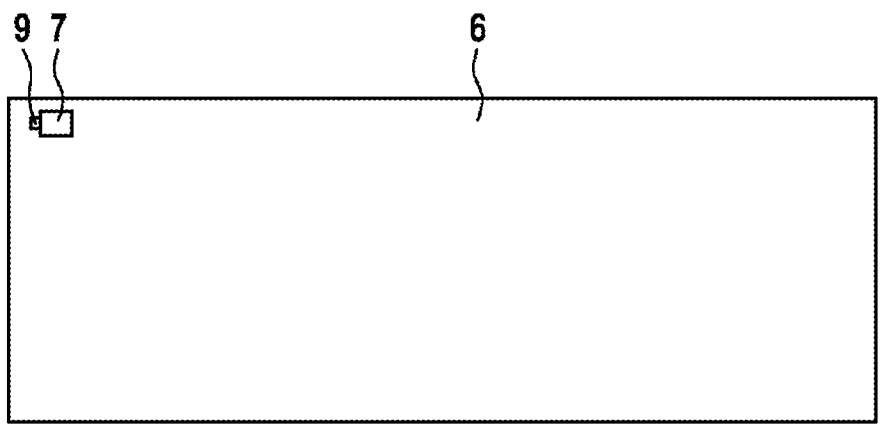
FIG. 2 shows a schematic plan view of a fuel cell of the invention.
Figure 3:
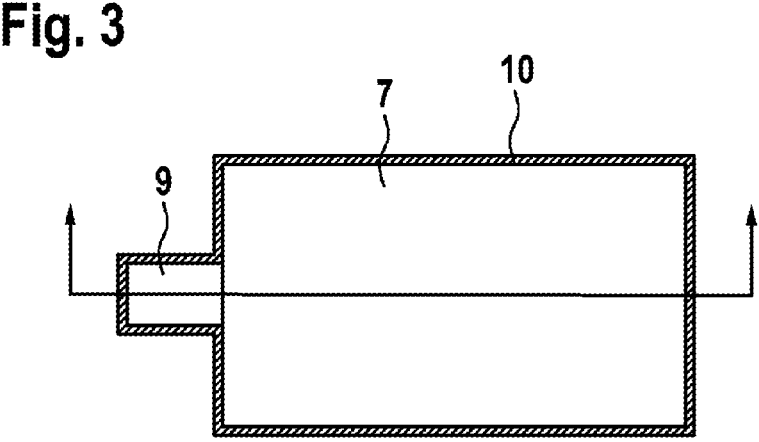
FIG. 3 shows a schematic representation of the short-circuit element of the fuel cell of FIG. 2.

From the plan view of FIG. 2 it is apparent that the short-circuit element 7 is applied on the outside to the bipolar plate 6 of the fuel cell, specifically in a corner region. The short-circuit element 7 may be, for example, a small plate or a membrane, and so has a comparatively flat construction. The short-circuit element 7 is elastically deformable.

Figure 4:
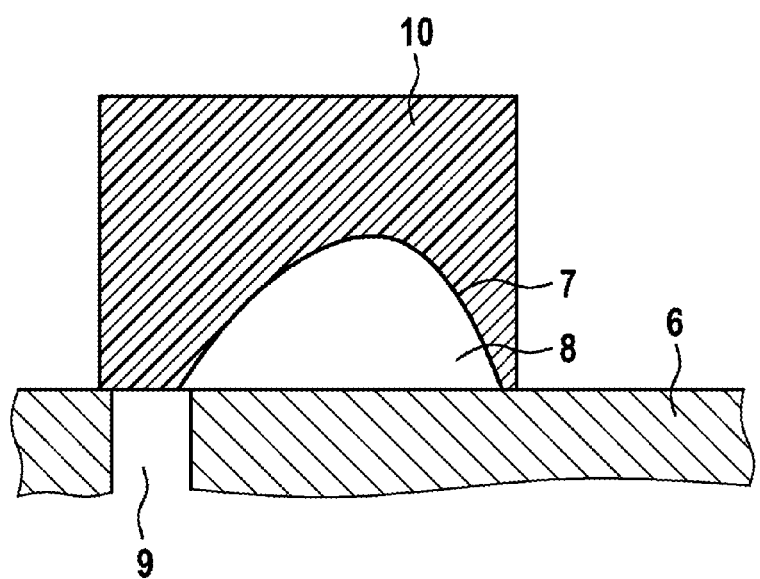
FIG. 4 shows a schematic longitudinal section through the fuel cell of FIG. 2.
Figure 5:
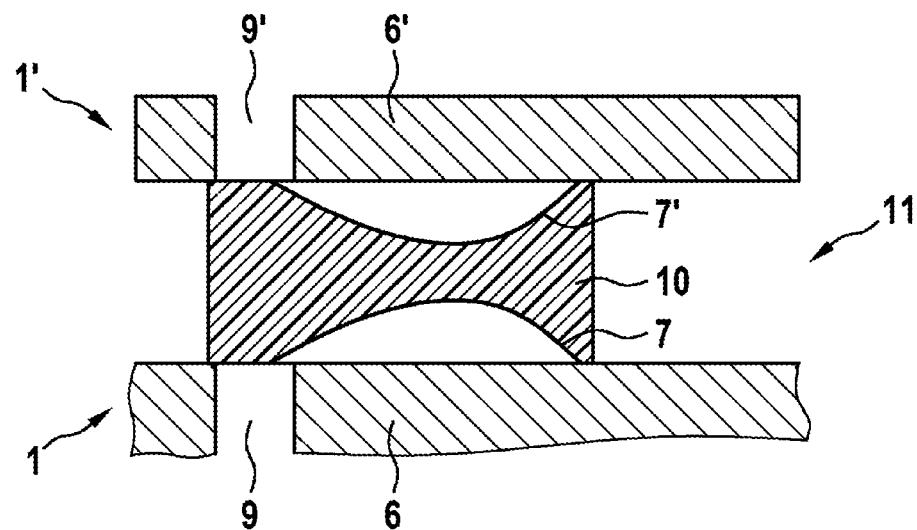
FIG. 5 shows a schematic longitudinal section through a fuel cell stack comprising the fuel cell of FIG. 4, without short-circuiting.
Figure 6:
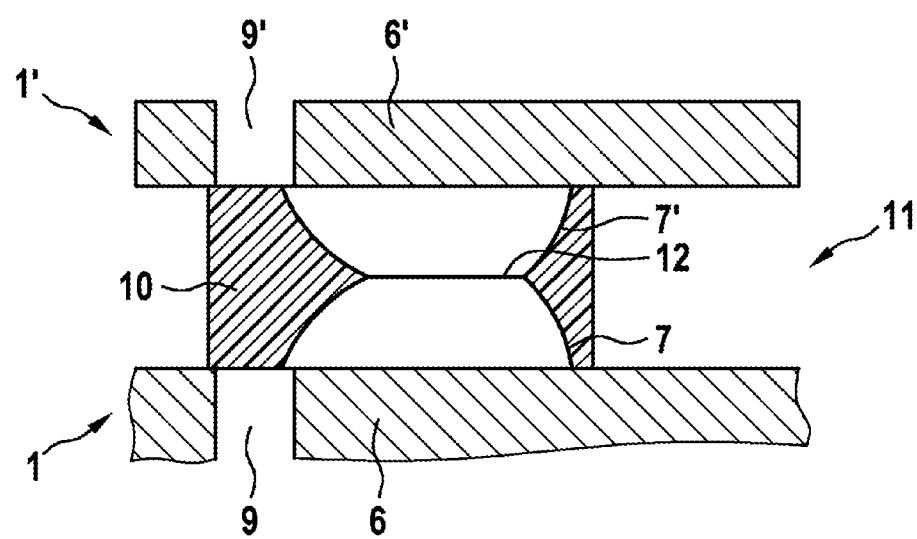
FIG. 6 shows a schematic longitudinal section through a fuel cell stack comprising the fuel cell of FIG. 4, with short-circuiting.

The short-circuit element 7 bounds a pressure compartment 8, which is formed preferably between the short-circuit element 7 and the bipolar plate 6 (see FIG. 4). Via a side channel 9 formed in the bipolar plate 6, the pressure compartment 8 can be subjected to a pressure medium, causing elastic deformation of the short-circuit element 7. For the sealing of the pressure compartment 8, the short-circuit element 7 is surrounded by a seal 10, which extends to the bipolar plate 6 and also seals the side channel 9 to the outside (see FIGS. 3 and 4).

Where two fuel cells 1, 1' each with at least one short-circuit element 7, 7' are arranged one above the other to form a fuel cell stack 11, the arrangement is such that two bipolar plates 6, 6' each lie opposite one another with a short-circuit element 7, 7', so that the two short-circuit elements 7, 7' are brought into overlap and are already slightly elastically deformed (see FIG. 5). When the pressure compartments 8, 8' (not shown) are subjected to a pressure medium via a central pressure supply, the two short-circuit elements 7, 7' undergo further deformation. In this way a short-circuit is produced via a common short-circuit face 12 (see FIG. 6). In order to regain the original state shown in FIG. 5, the pressure in the pressure compartments 8, 8' is stepped down.

Figure 7:
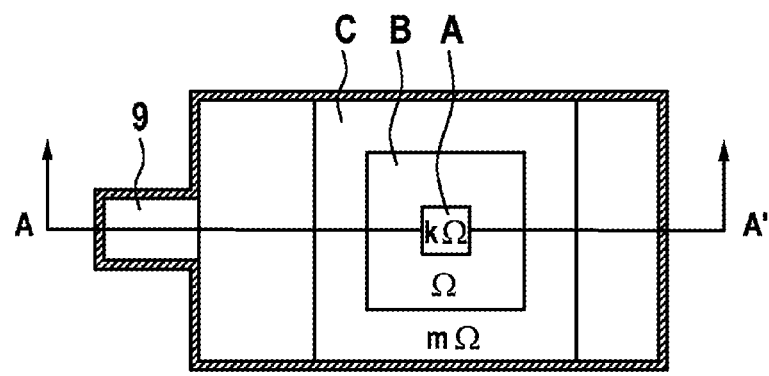
FIG. 7 shows a schematic representation of an alternative short-circuit element.
Figure 8:
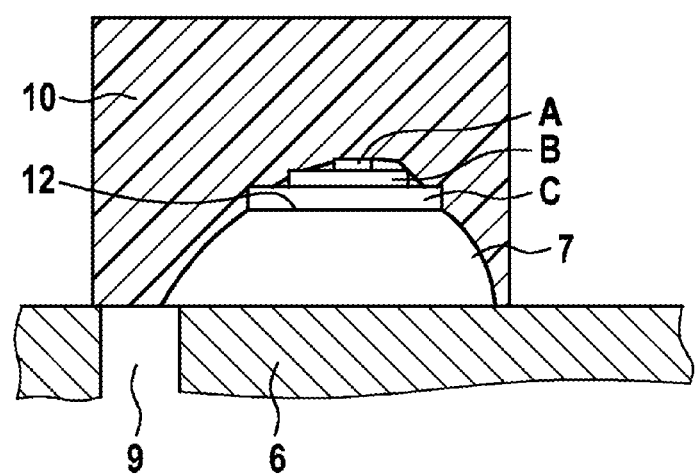
FIG. 8 shows a schematic longitudinal section through a fuel cell with the short-circuit element of FIG. 7.

An alternative embodiment of a short-circuit element 7 for a fuel cell 1 of the invention is apparent from FIGS. 7 and 8. In this case the short-circuit element 7 has zones A, B, C, which differ in terms of their electrical resistance. The electrical resistance of zone A is the highest and is in the KS/range, while the electrical resistance of zone B is in the Ω range and the electrical resistance of zone C is in the mΩ range or less. In this way it is ensured that on each contacting of the short-circuit element 7, the electrical resistance is continuously reduced, and, respectively, on each elimination of the short-circuit, it is continuously increased.

Figure 9:
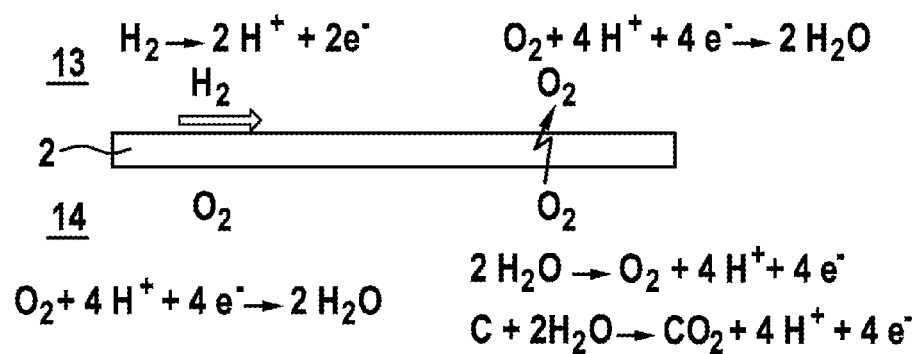
FIG. 9 shows a schematic diagram of the mode of operation of a fuel cell.
Figure 10:
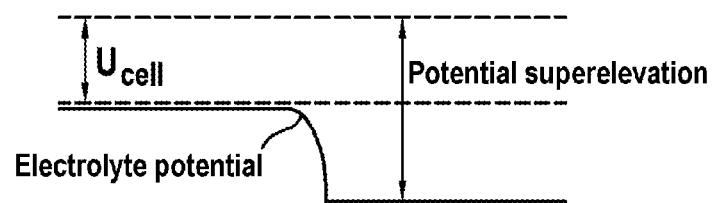
FIG. 10 shows a distribution of potential in a fuel cell.

FIG. 9 represents the state of a fuel cell 1 during start-up of the fuel cell stack 11. In the initial state, an anode region 13 and a cathode region 14 are full of air and oxygen (O$_2$) respectively. For start-up, hydrogen (H$_2$) is passed into the air-filled anode region 13, and so the hydrogen gradually displaces the air. In the state illustrated in FIG. 9, the left-hand side of the anode region 13 has already been supplied with hydrogen, whereas air is still present on the right-hand side of the anode region 13. In this case there is a distribution of potential of the kind represented illustratively in FIG. 10. On account of the gas distribution described, there are high differences in potential between the cathode 4 and the electrolyte, which is formed by the polymer membrane 2, and so the following equation is valid:

$$\Delta \varphi_C < 1 \text{ V}$$

These differences in potential lead to carbon corrosion in the catalyst layer 4 of the cathode and hence to degradation of the fuel cell 1. The degradation continues for as long as the H$_2$/O$_2$ gas front is moving through the anode region 13.

With the aid of the present invention it is possible to counteract the degradation caused by high differences in potential during start-up and run-down of the fuel cell 1, specifically by means of cell-specific short-circuiting.

The invention claimed is:

1. A fuel cell (1) for a fuel cell stack (11), comprising a polymer membrane (2) which serves as an electrolyte and which comprises on either side a catalyst layer (3, 4) for forming an anode (3) on one side and a cathode (4) on the other, the two catalyst layers (3, 4) each bearing an applied gas diffusion layer (5) and also an applied bipolar plate (6), wherein at least one bipolar plate (6) bears an applied, short-circuit element (7) on a side facing away from the gas diffusion layer (5) of a respective catalyst layer (3,4).

2. The fuel cell (1) as claimed in claim 1, wherein the short-circuit element (7) is an elastically deformable element.

3. The fuel cell (1) as claimed in claim 1, wherein the short-circuit element (7) bounds a pressurizable pressure compartment (8).

4. The fuel cell (1) as claimed in claim 3, wherein the pressure compartment (8) is pressurizable via a side channel (9).

5. The fuel cell (1) as claimed in claim 1, wherein the bipolar plate (6) and the short-circuit element (7) bear at least regionally an applied seal (10).

6. The fuel cell (1) as claimed in claim 1, wherein the short-circuit element (7) comprises different zones (A, B, C) which differ in terms of their electrical resistance.

7. The fuel cell (1) as claimed in claim 1, wherein the short-circuit element (7) is a printed short-circuit element.

8. The fuel cell (1) as claimed in claim 2, wherein the elastically deformable short-circuit element (7) is a plate or a membrane.

9. The fuel cell (1) as claimed in claim 3, wherein the short-circuit element (7), together with the bipolar plate (6), bounds the pressurizable pressure compartment (8).

10. The fuel cell (1) as claimed in claim 4, wherein the side channel (9) is formed in the bipolar plate (6) and/or traverses the bipolar plate (6).

11. The fuel cell (1) as claimed in claim 5, wherein the seal (10) is printed.

12. The fuel cell (1) as claimed in claim 5, wherein the seal (10) circumferentially surrounds and/or completely covers the short-circuit element (7).

13. A fuel cell stack (11) comprising at least two fuel cells (1) as claimed in claim 1, the fuel cells (1) being stacked such that the respective short-circuit elements (7) are disposed one above another in a mirrored disposition and in the event of a short circuit make contact with one another in a region of a common short-circuit face (12).

14. A method for operating the fuel cell stack (11) as claimed in claim 13, wherein the short-circuit elements (7) are selectively engaged and disengaged via a central pressure supply.

15. The method as claimed in claim 14, wherein the short-circuit elements (7) are pressurized via the central pressure supply and elastically deformed.

16. The method as claimed in claim 15, wherein the pressurization is carried out using a gas or a liquid.

17. The method as claimed in claim 16, wherein the gas is hydrogen or air.

18. The method as claimed in claim 16, wherein the liquid is a coolant.

\* \* \* \* \*